United States Patent
Dilger (10) Patent No.: US 11,063,681 B2
(45) Date of Patent: Jul. 13, 2021

(54) METHOD FOR OPERATING A COMMUNICATION NETWORK IN A RING TOPOLOGY

(71) Applicant: Siemens Aktiengesellschaft, Munich (DE)

(72) Inventor: Marco Dilger, Bühlertal (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/643,273

(22) PCT Filed: Jul. 27, 2018

(86) PCT No.: PCT/EP2018/070405
§ 371 (c)(1),
(2) Date: Feb. 28, 2020

(87) PCT Pub. No.: WO2019/042674
PCT Pub. Date: Mar. 7, 2019

(65) Prior Publication Data
US 2020/0213023 A1   Jul. 2, 2020

(30) Foreign Application Priority Data
Sep. 1, 2017 (EP) .................................... 17188950

(51) Int. Cl.
*H04J 3/06* (2006.01)
*H04L 12/42* (2006.01)
(Continued)

(52) U.S. Cl.
CPC .......... *H04J 3/0667* (2013.01); *H04L 12/422* (2013.01); *H04L 12/43* (2013.01);
(Continued)

(58) Field of Classification Search
CPC . H04L 12/422; H04L 12/437; H04L 12/4015; H04L 43/0811; H04L 43/0823;
(Continued)

(56) References Cited

U.S. PATENT DOCUMENTS 9,313,115 B2 * 4/2016 Kamerkar ............... H04L 43/50
10,715,441 B2 * 7/2020 Sweeney ................. H04L 47/29
(Continued)

FOREIGN PATENT DOCUMENTS

CN    103023771    4/2013
CN    103812735    5/2014
(Continued)

OTHER PUBLICATIONS

J. Specht and S. Samii, "Urgency-Based Scheduler for Time-Sensitive Switched Ethernet Networks," 2016 28th Euromicro Conference on Real-Time Systems (ECRTS), Toulouse, 2016, pp. 75-85, doi: 10.1109/ECRTS.2016.27. (Year: 2016).*
(Continued)

*Primary Examiner* — Redentor Pasia
(74) *Attorney, Agent, or Firm* — Cozen O'Connor (57) ABSTRACT

A communications network and method for operating the communications network that includes ring devices that are networked to one another in a ring topology, where the ring devices participate in a ring redundancy process in which an administrating ring device regularly sends test packets over the communications network, which received in sequence by other ring devices and successively forwarded by these devices back to the administrating ring device so as to detect faults in the communications network, where a transmission delay of a test packet along the ring topology because of interfering packets within the ring topology is prevented by synchronizing the ring devices and processing at least parts of a data traffic schedule in accordance with the 802.1Qbv (Continued)

standard in the ring redundancy process applied, and where transmission of the test packets is scheduled and controlled such that the packets are forwarded to the ring devices substantially without delay.

14 Claims, 4 Drawing Sheets

(51) Int. Cl.
*H04L 12/43* (2006.01)
*H04L 12/26* (2006.01)

(52) U.S. Cl.
CPC .......... *H04L 43/0811* (2013.01); *H04L 43/12* (2013.01); *H04L 43/50* (2013.01); *H04L 2012/421* (2013.01)

(58) Field of Classification Search
CPC ......... H04L 43/08; H04L 43/12; H04L 43/50; H04L 43/022; H04L 43/067; H04L 43/0852
See application file for complete search history.

(56) References Cited

U.S. PATENT DOCUMENTS

| | | | |
|---|---|---|---|
| 2005/0058149 A1* | 3/2005 | Howe | H04L 47/17 370/428 |
| 2010/0208595 A1* | 8/2010 | Zhao | H04L 69/40 370/242 |
| 2011/0274010 A1 | 11/2011 | Kwon et al. | |
| 2012/0030310 A1 | 2/2012 | Goetz et al. | |
| 2014/0126578 A1 | 5/2014 | Yoon et al. | |
| 2015/0124600 A1 | 5/2015 | Noebauer et al. | |
| 2015/0365337 A1* | 12/2015 | Pannell | H04J 3/0697 370/503 |
| 2016/0294697 A1* | 10/2016 | Varadarajan | H04L 47/28 |
| 2018/0309656 A1* | 10/2018 | Regev | G06F 11/273 |
| 2019/0149898 A1* | 5/2019 | Shang | H04J 3/0652 398/25 |
| 2019/0260671 A1* | 8/2019 | Caird | H04L 45/02 |
| 2019/0335024 A1* | 10/2019 | Hummen | H04L 43/106 |

FOREIGN PATENT DOCUMENTS

| | | |
|---|---|---|
| EP | 2413538 | 2/2012 |
| EP | 2501080 | 9/2012 |
| WO | WO 2013/044741 | 4/2013 |

OTHER PUBLICATIONS

PCT International Search Report arid Written Opinion of International Searching Authority dated Sep. 14, 2018 based on PCT/EF2018/070405 filed Jul. 27, 2018.

Office Action dated Dec. 1, 2020 issued Chinese Patent Application No. 201880056689.6.

* cited by examiner

METHOD FOR OPERATING A COMMUNICATION NETWORK IN A RING TOPOLOGY

CROSS-REFERENCE TO RELATED APPLICATIONS

This is a U.S. national stage of application No. PCT/EP2018/070405 filed Jul. 27, 2018. Priority is claimed on EP Application No. 17188950 filed Sep. 1, 2017, the content of which is incorporated herein by reference in its entirety.

BACKGROUND OF THE INVENTION

1. Field of the Invention

The present invention relates to a communication network and method for operating a communication network, in particular an Ethernet network, having ring devices, which are networked to one another via ring lines in a ring topology, where the ring devices use a ring redundancy method for transmitting data using a ring redundancy protocol, in which a managing ring device regularly sends test packets via the communication network in both ring directions, where the test packets are each received in order by the other devices and progressively forwarded from the other ring devices back to the managing ring device so as to detect faults on the communication network.

2. Description of the Related Art

Fail safety is an important requirement in factory and process automation or for electrical supply. To increase network availability, industrial communication networks are equipped with redundant physical connecting paths between the network nodes or network devices. It is best practice to connect the network devices via lines in the form of a ring topology. To this end, each network device comprises two ring ports and the lines each run between two ring ports of two immediately adjacent network devices—called ring devices below. The installation of a ring topology involves relatively little wiring complexity in comparison with other network topologies. In addition, a ring topology allows comparatively fast detection of network faults and comparatively fast reconfiguration of the network.

During the operation of such a communication network in a ring topology, the ring devices use a ring redundancy method for transmitting data, such as control data and/or user data. The applicant is aware of various ring redundancy methods that use various realtime ring redundancy protocols for interchanging data. A common feature of all ring redundancy methods based on test packets is that one of the ring devices (referred to as the managing ring device below) regularly sends test packets in both directions of the ring topology via the communication network. To be more precise, the managing ring device sends the test packets on one of its ring ports via the ring, the test packets being progressively forwarded by the other ring devices. When the test packets have completely passed through the ring topology, they are received by the managing ring device via its other ring port. Here, the managing ring device can conclude that the ring of the ring topology is closed, i.e., the communication network is fault-free. Consequently, the managing ring device disables one of its ring ports for all the communication with the exception of the test packets, in order to prevent continuously circulating packets or Ethernet broadcasts in the ring.

Alternatively, there is the possibility of the managing ring device to detect a fault on the communication network. The reason is that if a component, i.e., a ring device or a ring line, of the communication network fails as a result of a line fracture or a ring device defect, for example, the test packets sent from one ring port of the managing ring device do not arrive at the other ring port of the managing ring device, which the managing ring device can detect. Failure of one ring device must not affect the communication of the remainder of the ring devices, however, or must affect it only within as short as possible a down time of the network (what is known as the reconfiguration time). In a ring redundancy method, the communication is therefore continued via an alternative communication path, referred to as the redundancy path.

What is known as the media redundancy protocol (MRP) is discussed in more detail below in an exemplary manner. The MRP involves the managing ring device—referred to as the media redundancy manager (MRM) following a detected fault by opening an alternative communication path by virtue of the MRM enabling its hitherto disabled ring port and informing the other ring devices (referred to as media redundancy clients (MRCs)) of the changed topology by transmitting topology change packets, and forwarding the packets of said other ring devices in both ring directions. The MRCs therefore do not put their packets onto the interrupted path, but rather send them via the MRM.

A relationship for calculating the reconfiguration time $T_{rec}$ of a communication network in a ring topology, where the communication network is operated using the MRP redundancy method, is known from the standardization document International Electrotechnical Commission (IEC) FDIS 62439-2 (High Availability Automation Networks), chapter 9.9 (Calculation of MRP ring recovery time). The relationship is made up of a sum of two variables, namely $T_{detect}$ and $T_{flush}$:

$$T_{rec} = T_{detect} + T_{flush} \tag{1}$$

Eq. 1

Here, $T_{detect}$ is the time from the occurrence of the fault to the detection thereof in the MRM and is in turn made up of the sum of two variables, namely $T_{test}$ and $T_{ring}$:

$$T_{detect} = T_{test} T_{ring} \tag{2}$$

Eq. 2

Here, $T_{test}$ is a period of time during which no test packets arrive at the MRM and after which the MRM finally detects a fault:

$$T_{test} = \text{MRP\_TSTdefault}T \times \text{MRP\_TSTNRmax} \tag{3}$$

Eq. 3

Here, MRP_TSTdefaultT is the MRP_test default interval, i.e., the time interval of the test packets, i.e., the frequency with which test packets are sent via the ring topology. MRP_TSTNRmax is the MRP_Test monitoring count, i.e., the minimum number of missing packets after which a fault is detected.

$T_{ring}$ is the period of time that a test packet requires in order to pass through the entire ring topology:

$$T_{ring} = N \times (T_{switch} + T_{queue} + T_{bit} + T_{line}) \tag{4}$$

Eq. 4

Here, N is the total number of participating ring devices. $T_{switch}$ is the time delay introduced by each switching node. $T_{queue}$ is the time delay introduced by a packet that is already in the buffer of a ring device, for example, and that is transmitted on the communication network, as a result of which the transmission of a test packet is delayed. The reason is that when a test packet is supposed to be sent on a ring port of a ring device, it must first wait until a previous fault packet or "best effort" data traffic with lower priority than the test packet has been sent completely on the ring port. In addition, $T_{bit}$ is the time that a ring device needs to send or receive test packets. Finally, $T_{line}$ is the signal propagation time of the packets on the physical medium, which can frequently be ignored when the distance between the ring devices is normal.

Following the detection of the fault, the MRM begins to send topology change packets to the other ring devices, in order to initiate emptying of the "filtering database" (FDB) in the ring devices, after a "hold-down" time. The second expression $T_{flush}$ in the aforementioned Eq. 1 for calculating the reconfiguration time $T_{rec}$ is therefore made up as follows:

$$T_{flush} = T_{hold} + T_{ring} + T_{FDB} \tag{5}$$

Eq. 5

Here, $T_{hold}$ is made up as follows:

$$T_{hold} = MRP\_TOPchgT \times MRP\_TOPNRmax \tag{6}$$

Eq. 6

Here, MRP_TOPchgT is the "Topology change request interval", i.e., the time interval of the topology change packets, i.e., the frequency with which topology change packets are sent. MRP_TOPNRmax is the "Topology change repeat count", i.e., a variable indicating how often topology change packets are sent. The reason is that it is frequently necessary to send the topology change packets repeatedly in order to ensure that the intended changes have also actually been made on each ring device of the ring topology.

$T_{FDB}$ is the period of time that a ring device needs in order to empty its FDB.

The relationship for calculating the reconfiguration time $T_{rec}$ is therefore as follows:

$$T_{rec} = MRP\_TSTdefaultT \times MRPTSTNRmax + 2N \times (T_{switch} + T_{queue} + T_{bit} + T_{line}) + T_{FDB} + T_{hold} \tag{7}$$

Eq. 7

Although the above relationship for calculating the reconfiguration time $T_{rec}$ has been explained within the context of the MRP method, it also applies in the same manner to other ring redundancy methods based on the use of test packets.

The present application is concerned with the reconfiguration time $T_{rec}$ in a "worst case" scenario, which does not necessarily have to occur but, if it does occur, results in a problematically high reconfiguration time. In this scenario, it is assumed that, at the moment at which a high-priority test packet is sent, another packet (what is known as a fault packet or "best effort" data traffic packet) having a maximum length of 1522 bytes is in the communication network for transmission. The transmission of an Ethernet packet cannot be interrupted. Consequently, the test packet must first wait in an output waiting loop of a ring device. In this "worst case" scenario, the time delay $T_{queue}$ in each ring device therefore assumes a maximum value of 122 μs. In the text below, Eq. 7 is used in an exemplary manner to calculate the reconfiguration time $T_{rec}$ for a total number of 14 or 50 ring devices within the communication network, the signal propagation time $T_{line}$ having been assumed to be negligible, i.e., $T_{line}=0$ was set.

$$T_{rec}(N=14)=1 \text{ ms} \times 3 + 2 \times 14 \times (10 \text{ μs} + 122 \text{ μs} + 5.12 \text{ μs}) + 0.5 \text{ ms} + 1.5 \text{ ms} = 8.8 \text{ ms} \tag{8}$$

$$T_{rec}(N=50)=1 \text{ ms} \times 3 + 2 \times 50 \times (10 \text{ μs} + 122 \text{ μs} + 5.12 \text{ μs}) + 0.5 \text{ ms} + 1.5 \text{ ms} = 18.8 \text{ ms} \tag{9}$$

Eq. 8 and Eq. 9

It can be seen that, in particular with a rising total number of ring devices, the resulting reconfiguration time $T_{rec}$ is definitively determined by $T_{queue}$ and assumes a relatively high value. Packet losses cannot be ruled out within the reconfiguration time, however. As a result, the efforts go into minimizing the reconfiguration time.

To date, there has been the obligation to limit the maximum number of ring devices or to reduce the time interval of the test packets MRP_TSTdefaultT in order to guarantee a required reconfiguration time $T_{rec}$. A stipulated maximum number of ring devices results in undesirable limitation of the network size, however. Reducing the time interval of the test packets, i.e., increasing the number of test packets sent, leads to increased network load from test packets and hence to an increased CPU load in the managing ring device or MRM. For the purpose of better illustration, it should be pointed out that the time interval of 1 ms assumed for Eq. 8 and Eq. 9 means that a CPU of the managing ring device needs to process 2000 test packets per second at the reception end and similarly needs to send 2000 packets.

In a "worst case" scenario of the type described above, it would thus be desirable to be able to set the time delay $T_{queue}$ to the value 0. The reason is that as the calculations below, which are calculations (8) and (9) adapted with $T_{queue}=0$, show, this would result in a distinctly shorter reconfiguration time $T_{rec}$.

$$T_{rec}(N=14)=1 \text{ ms} \times 3 + 2 \times 24 \times (10 \text{ μs} + 5.12 \text{ ms}) + 0.5 \text{ ms} + 1.5 \text{ ms} = 5.4 \text{ ms} \tag{10}$$

$$T_{rec}(N=50)=1 \text{ ms} \times 3 + 2 \times 50 \times (10 \text{ μs} + 5.12 \text{ μs}) + 0.5 \text{ ms} + 1.5 \text{ ms} = 6.5 \text{ ms} \tag{11}$$

Eq. 10 and Eq. 11

SUMMARY OF THE INVENTION

Against the foregoing background, it is therefore an object of the present invention to provide a method for operating a communication network in a ring topology that guarantees a required reconfiguration time in an efficient manner in the event of at least one fault packet being present within the communication network.

This and other objects and advantages are achieved in accordance with the present invention by a method in which a delay in the transmission of a test packet along the ring topology on account of at least one fault packet within the ring topology is prevented by:

a) synchronizing the time of all ring devices; and b) implementing at least portions of a data traffic scheduling and handling, in particular the complete data traffic scheduling and handling, in accordance with the Institute of Electrical and Electronics Engineers (IEEE) 802.1Qbv standard in the applied ring redundancy method by applying at least portions of a time aware shaper method, in particular a complete time aware shaper method, comprising b1) sorting all test packets in the individual ring devices into a separate data traffic priority class; b2) allocating an exclusive send queue for the data traffic priority class of the test packets for each ring device;

b3) defining a protected send time window for the allocated send queue for each ring device; and b4) setting up a guard time band at a time immediately before each protected send time window, no data transmission being started within the guard time band, but a data transmission started shortly before the beginning of the guard time band being able to be completed, where the transmission of the test packets is scheduled and controlled such that they are each forwarded to the ring devices within the send time window of a ring device at least substantially without a waiting period.

The invention is therefore based on the concept of using methods defined in the IEEE 802.1Qbv standard to optimize the "worst case" behavior in ring redundancy methods. To be more precise, the transmission of the test packets is supposed to be scheduled and controlled such that they are forwarded to each ring device within a send time window that is protected and intended specifically for test packets without a waiting time, i.e., in the spirit of a "run of green traffic lights". This results in the value $T_{queue}$ that is at least substantially equal to 0, preferably equal to 0. This, in turn, results in the reconfiguration time $T_{rec}$ being distinctly reduced in comparison with conventional ring redundancy methods, as is evident, for example from Eq. 10 and Eq. 11 in comparison with Eq. 8 and Eq. 9. A substantially shorter reconfiguration time $T_{rec}$ can therefore be guaranteed when the time interval of the test packets is the same and/or when the number of ring devices is the same. Similarly, the necessary time interval of the test packets can be increased for a required reconfiguration time $T_{rec}$ to achieve a lower CPU utilization level in the managing ring device.

In accordance with one embodiment of the invention, the managing ring device can assume the role of a reference clock for the time synchronization during step a), and a time of the managing ring device can be used as a reference time. Expediently, during step a), the time synchronization of all ring devices is effected using the precision time protocol (PTP), in particular in accordance with the IEEE 1588 standard, the IEEE 802.1AS standard and/or the IEEE 802.1AS-Rev standard. Here, the managing ring device can assume the role of the grandmaster block in the PTP.

Preferably, the protected send time window of a ring device is arranged in a manner offset from the protected send time window of an immediately preceding ring device by the respective line delay of the ring line between the ring device and the immediately preceding ring device, where this arrangement of the send time windows is performed for both transmission directions for test packets within the ring topology. This measure allows the protected send time window of each ring device to be kept relatively narrow. There is therefore no wastage of bandwidth resources.

The line delay on a ring line can be determined by applying a peer-to-peer method in accordance with the IEEE 1588 standard and/or the IEEE 802.1AS standard. This peer-to-peer method involves the line delay being calculated. For the specific calculation, reference is made in particular to chapter 11.4 of the IEEE 1588 standard.

Advantageously, during step b4), the guard time band is chosen to be of the same magnitude as the transmission time for the largest possible data packet. This ensures that a data transmission started shortly before the beginning of the guard time band, for example, a transmission of "best effort" data, is still completed within the guard time band and, hence, before the beginning of the protected send time window for test packets and, hence, interference in the test packets as a result of "best effort" data traffic is avoided.

The ring redundancy method can be a media redundancy protocol (MRP) method. Here, the managing ring device assumes the role of the media redundancy manager (MRM). The ring redundancy method may also be another ring redundancy method based on the use of test packets, however. Examples mentioned are the high-speed redundancy protocol (HRP) method, the device-level-ring (DLR) method, the resilient packet ring (RPR) method, the Moxa Turbo Ring method and the Hiper Ring protocol method.

In one embodiment of the method in accordance with the invention, cut-through switching is activated for the protected send time window of each ring device. This is possible because the protected send time window contains no fault packets or "best effort" data traffic. In a manner known per se, the cut-through switching method involves the switching process in the ring device being initiated even before the complete test packet has arrived. This also allows the expression $T_{switch}$ in the calculation formula for the reconfiguration time of the communication network to be minimized.

It is also an object of the present invention to provide a communication network, in particular an Ethernet network, having ring devices, including a managing ring device, which are networked to one another via ring lines in a ring topology, where the communication network is configured to be operated based on the method in accordance with the disclosed embodiments of the invention. The ring devices in this instance may each be a switch, a bridge, a router and/or a hub.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will become clear on the basis of the description that follows for an exemplary embodiment of a communication network according to the present invention with reference to the accompanying drawings, in which.

DETAILED DESCRIPTION OF THE EXEMPLARY EMBODIMENTS

Figure 1:
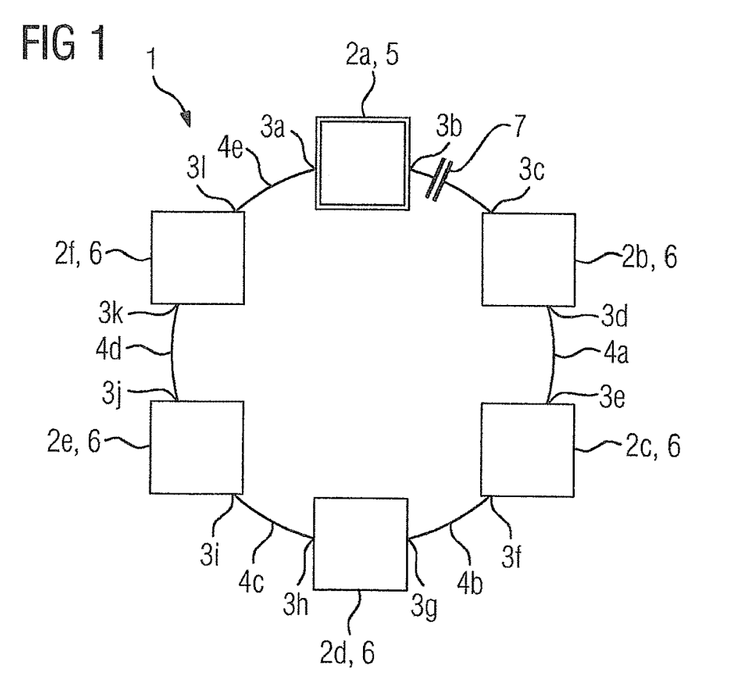
FIG. 1 is a schematic view of a communication network in accordance with a first embodiment of the present invention in a fault-free state.
Figure 2:
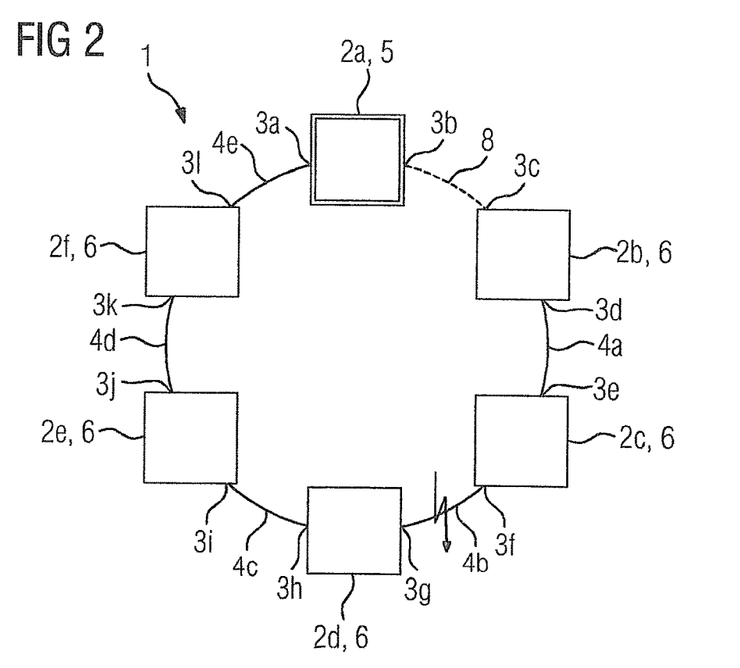
FIG. 2 is a schematic view of the communication network from FIG. 1 in a fault state.

FIGS. 1 and 2 show schematic views of a communication network 1 in accordance with an embodiment of the present invention. The communication network 1, in the present case an Ethernet network, comprises six ring devices 2a-f, in this exemplary embodiment switches, having two ring ports 3a-l each. The ring devices 2a-f are networked to one another via five ring lines 4a-e in a ring topology, the ring lines 4a-e each running between two ring ports 3a-l of two immediately adjacent ring devices 2a-f. The ring devices 2a-f use an MRP ring redundancy method for transmitting data, to be more precise control data and user data, using the MRP protocol. The MRP ring redundancy method involves the ring device 2a, which assumes the role of a managing ring device, called the redundancy manager or MRM 5 in the case of the MRP, regularly sending test packets in both ring directions via the communication network 1. To be more precise, the MRM 5 sends test packets on one of its ring ports 3a, 3b via the ring of the ring topology and subsequently receives them again via the other of its ring ports 3a, 3b. The test packets are each received in order by the other ring devices 2b-f (called redundancy clients or MRCs 6 in the case of the MRP) and progressively forwarded from the other ring devices back to the MRM 5 so as to detect faults on the communication network 1.

While the MRM 5 again receives the test packets transmitted by it, i.e., the communication network 1 is fault-free, the MRM 5 disables one of its ring ports (in the present exemplary embodiment the ring port 3b) for all the communication with the exception of the test packets. This prevents Ethernet broadcasts from continuously circulating in the ring. The disabling of the ring port 3b is indicated by an appropriate disable symbol 7 in FIG. 1.

FIG. 2 shows the communication network 1 in a fault state. The fault in this case is a failure of the ring line 4b as a result of a line fracture, which is highlighted via a lightning symbol. The fault means that the test packets hitherto sent via the ring port 3a of the MRM 5 arrive neither at the other ring port 3b of the MRM 5 nor at the ring ports 3d, 3f of the ring devices 2b, 2c. Similarly, the test packets hitherto sent via the ring port 3b of the MRM 5 arrive neither at the other ring port 3a nor at the ring ports 3g, 3i, 3k of the ring devices 2d, 2e, 2f. Following the detection of the fault, the MRM 5 thus opens an alternative communication path, the redundancy path 8, by enabling its hitherto disabled ring port 3b, informing the other ring devices 2b-f of the changed topology by transmitting topology change packets, and forwarding the packets of the other ring devices in both ring directions from now on. This restores the functionality of the communication network 1 until the fault is cleared.

The communication network 1 is operated such that it is again available after a relatively short reconfiguration time, i.e., down time, after the occurrence of the fault. To achieve this, the transmission of each test packet along the ring topology is prevented from being delayed on account of at least one fault packet within the ring topology. According to the invention, this is achieved by: a) synchronizing the time of all ring devices 2a-f;

b) implementing at least portions of a data traffic scheduling and handling, in particular the complete data traffic scheduling and handling, in accordance with the IEEE 802.1Qbv standard in the applied ring redundancy method by applying at least portions of a time aware shaper method, in particular a complete time aware shaper method, comprising the steps of:

b1) sorting all test packets in the individual ring devices 2a-f into a separate data traffic priority class;

b2) allocating an exclusive send queue for the data traffic priority class of the test packets for each ring device 2a-f;

b3) defining a protected send time window SZF for the allocated send queue for each ring device 2a-f; and b4) setting up a guard time band of the magnitude of the transmission time for the largest possible data packet at a time immediately before each protected send time window SZF, no data transmission being started within the guard time band, but a data transmission started shortly before the beginning of the guard time band being able to be completed, where the transmission of the test packets is scheduled and controlled such that they are each forwarded to the ring devices 2a-f within the send time window SZF of a ring device 2a-f at least substantially without a waiting period.

The time synchronization of all ring devices 2a-f of the communication network 1 is effected using the PTP protocol in accordance with the IEEE 1588 standard, where the MRM 5 assumes the role of the grandmaster clock.

Figure 3:
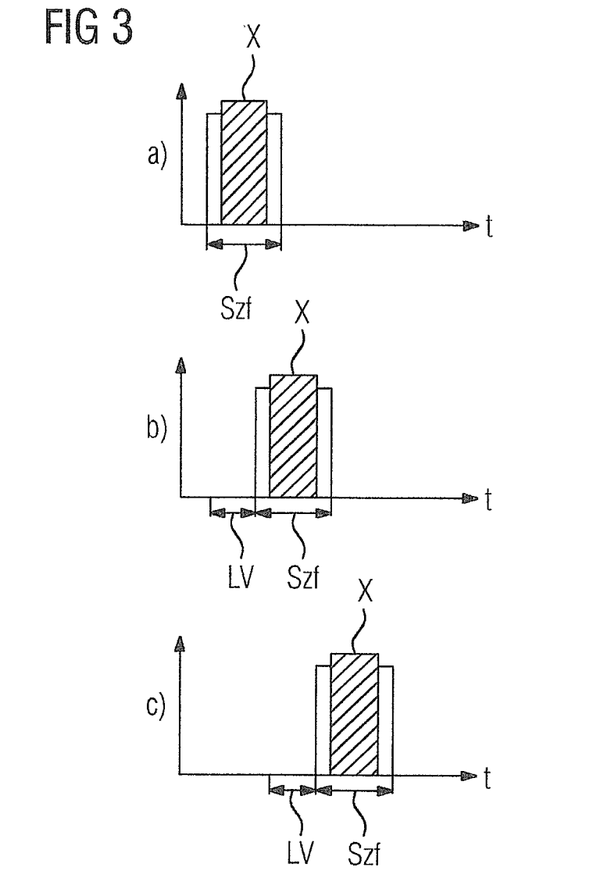
FIG. 3 shows graphical plots of the protected send time windows for three successive ring devices of the communication network from FIG. 1.

In addition, during the operation of the communication network 1, the protected send time window SZF of each ring device 2a-f is arranged in a manner offset from the protected send time window SZF of an immediately preceding ring device 2a-f by the respective line delay LV of the ring line 4a-e between the ring device 2a-f and the immediately preceding ring device 2a-f. This arrangement of the send time windows SZF is performed for both transmission directions for test packets within the ring topology. This involves the line delay LV on the respective ring line being determined by applying a peer-to-peer method in accordance with the IEEE 1588 standard. The principle of the mutually offset send time windows SZF is depicted schematically in FIG. 3 for three arbitrary successive ring devices 2a-f, for example, the ring devices 2a, 2f, 2e, of the communication network 1. In this instance, FIG. 3a) relates to a first ring device 2a-f, FIG. 3b) relates to a subsequent second ring device 2a-f and FIG. 3c) relates to a subsequent third ring device 2a-f. Specifically, it can be seen that, when an Ethernet test packet (frame X) is transmitted by the three ring devices 2a-f, the send time for the test packet in the second ring device 2a-f (see b)) moves to the right by LV on the time axis on account of the line delay LV between the first ring device 2a-f and the second ring device 2a-f. Similarly, the send time for the test packet in the third ring device 2a-f (see c)) moves to the right by LV on the time axis on account of the line delay LV between the second ring device 2a-f and the third ring device 2a-f. Accordingly, the protected send time window SZF of the second ring device 2a-f is arranged in a manner offset from the protected send time window SZF of the first ring device 2a-f by the line delay LV, and the protected send time window SZF of the third ring device 2a-f is arranged in a manner offset from the protected send time window SZF of the second ring device 2a-f by the line delay LV. In this instance, the line delays LV of the ring lines 4a-e are of the same magnitude. The above-described arrangement of the send time windows SZF means that a relatively small send window needs to be reserved in each ring device 2a-f and there is no wastage of bandwidth resources. Naturally, it should be understood all six send time windows SZF of the six ring devices 2a-f are offset from one another as appropriate, even if this is not depicted explicitly in FIG. 3.

Figure 4:
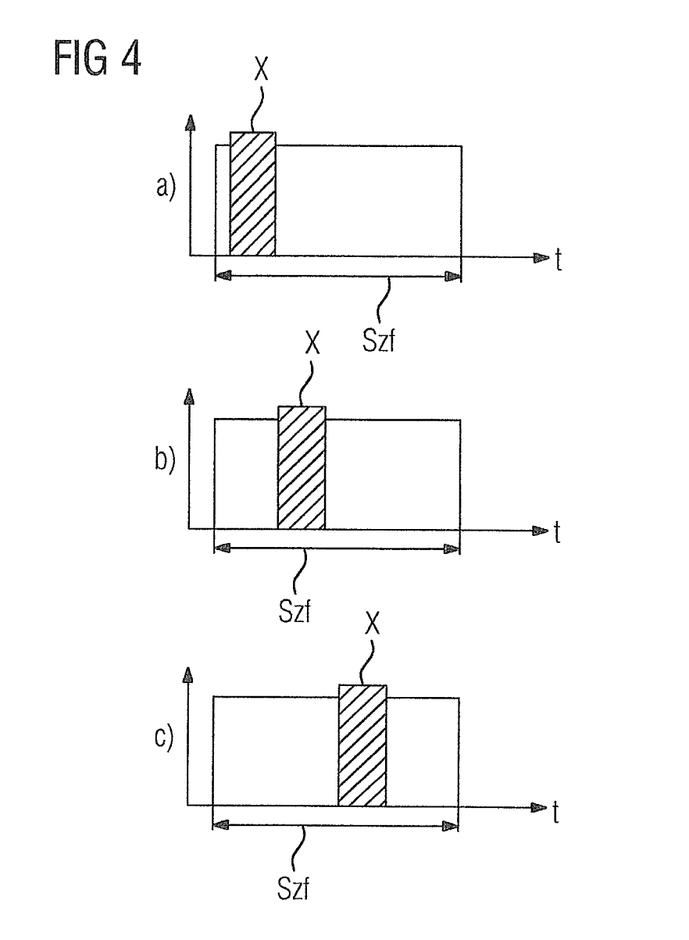
FIG. 4 shows graphical plots of the protected send time windows for three successive ring devices in an alternative mode of the communication network from FIG. 1.

FIG. 4 illustrates an alternative mode of the above-described communication network 1, which differs from the above-described mode merely by the protected send time windows SZF of the ring devices 2a-f not being offset from one another by the line delay LV. Accordingly, all the ring devices 2a-f have a protected send time window SZF active at the same time, even if the test packet to be sent has not yet arrived at some ring devices 2a-f. In this way, a larger protected send time window SZF needs to be reserved on each of the ring devices 2a-f.

Moreover, cut-through switching is activated for the protected send time window SZF of each ring device 2a-f.

Primarily English specialist terms are used in the specialist field of the present invention. Accordingly, some of the specialist terms used in the German version of this application together with their equivalent English specialist terms are listed below for the purpose of better orientation: queue, data traffic priority class (traffic class), guard time band (guard band), line, port, ring device (node), reconfiguration time (or recovery time), scheduling, switching node, output waiting loop (egress queue).

Although the invention has been illustrated and described more specifically in detail by means of the preferred exemplary embodiments, the invention is not limited by the disclosed examples, and other embodiments can be derived therefrom by a person skilled in the art without departing from the scope of protection of the invention. As such, the ring redundancy method may, for example, also be an HRP, DLR, RPR, Moxa Turbo Ring or Hiper Ring protocol method.

Figure 5:
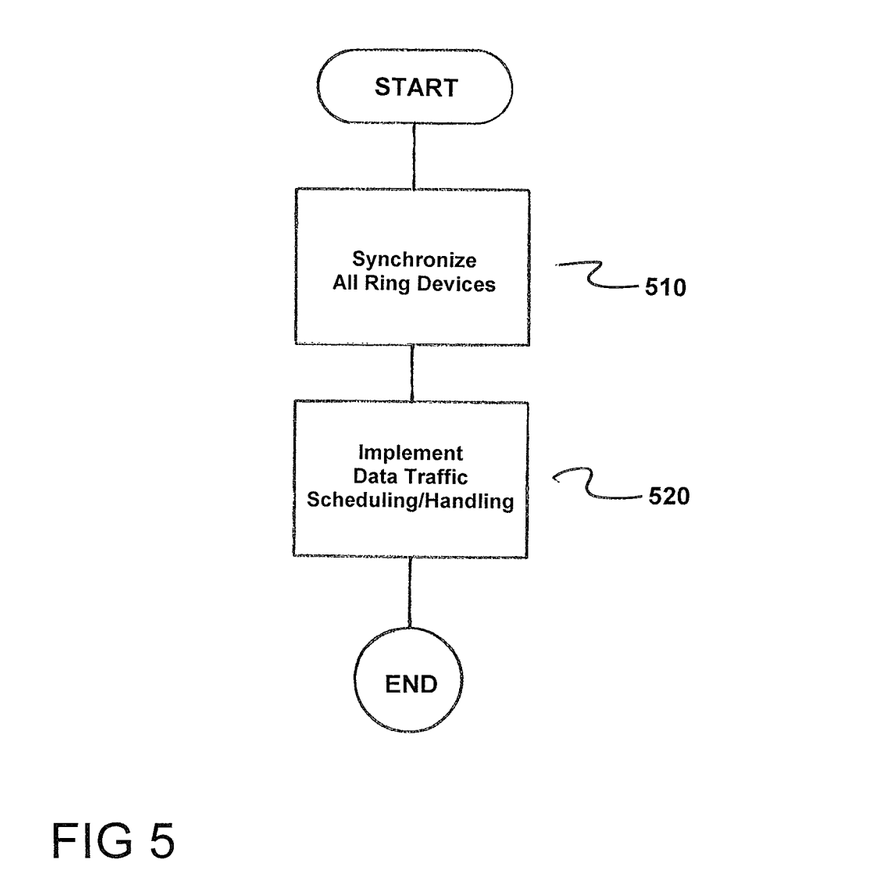
FIG. 5 is a flowchart of the method in accordance with the invention.

FIG. 5 is flowchart of the method for operating a communication network 1 having ring devices 2a-f that are networked to one another via ring lines 4a-e in a ring topology, where the ring devices 2a-f use a ring redundancy method for transmitting data utilizing a ring redundancy protocol, in which a managing ring device 2a regularly sends test packets via the communication network 1 in both ring directions, and where test packets are each received in order by other ring devices 2b-f and progressively forwarded from the other ring devices back to the managing ring device 2a so as to detect faults on the communication network 1.

In order to prevent a delay in transmission of a test packet along the ring topology on account of at least one fault packet within the ring topology, the method comprises synchronizing a time of all ring devices (2a-f), as indicated in step 510. Next, at least portions of a data traffic scheduling and handling comprising complete data traffic scheduling and handling are implemented, in accordance with Institute of Electrical and Electronics Engineers (IEEE) 802.1Qbv standard in an applied ring redundancy method by applying at least portions of a time aware shaper method comprising a complete time aware shaper method, as indicated in step 520.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a communication network having ring devices which are networked to one another via ring lines in a ring topology, the ring devices utilizing a ring redundancy method for transmitting data utilizing a ring redundancy protocol, in which a managing ring device regularly sends test packets via the communication network in both ring directions, said test packets each being received in order by other ring devices and progressively forwarded from said other ring devices back to the managing ring device so as to detect faults on the communication network, in order to prevent a delay in transmission of a test packet along the ring topology on account of at least one fault packet within the ring topology, the method comprising:
    a) synchronizing a time of all ring devices;
    b) implementing at least portions of a data traffic scheduling and handling comprising complete data traffic scheduling and handling, in accordance with Institute of Electrical and Electronics Engineers (IEEE) 802.1Qbv standard in an applied ring redundancy method by applying at least portions of a time aware shaper method comprising a complete time aware shaper method, comprising:
        b1) sorting all test packets in individual ring devices into a separate data traffic priority class;
        b2) allocating an exclusive send queue for the data traffic priority class of the test packets for each ring device;
        b3) defining a protected send time window for an allocated send queue for each ring device; and
        b4) setting up a guard time band at a time immediately before each protected send time window, no data transmission being started within the guard time band, but a data transmission started shortly before the beginning of the guard time band being completeable;
    wherein the transmission of the test packets is scheduled and controlled such that the test packets are each forwarded to the ring devices within the send time window of a ring device without a waiting period.

2. The method as claimed in claim 1, wherein during step a), the time synchronization of all ring devices (2a-f) is effected using the precision time protocol (PTP) in accordance with at least one of (i) IEEE 1588 standard, (ii) IEEE 802.1AS standard and (iii) IEEE 802.1AS-Rev standard.

3. The method as claimed in claim 1, wherein the managing ring device takes on a role of a reference clock comprising a grandmaster clock in a precision time protocol (PTP) for the time synchronization in step a), and a time of the managing ring device is utilized as a reference time.

4. The method as claimed in claim 2, wherein the managing ring device takes on a role of a reference clock comprising a grandmaster clock in the PTP for the time synchronization in step a), and a time of the managing ring device is utilized as a reference time.

5. The method as claimed in claim 1, wherein the protected send time window of a ring device is arranged in a manner offset from the protected send time window of an immediately preceding ring device by a respective line delay of the ring line between the ring device and the immediately preceding ring device, said arrangement of the send time windows being performed for both transmission directions for test packets within the ring topology.

6. The method as claimed in claim 5, wherein the line delay on a ring line is determined by applying a peer-to-peer method in accordance with at least one of (i) IEEE 1588 standard and (ii) IEEE 802.1AS standard.

7. The method as claimed in claim 1, wherein during step b4), the guard time band is chosen to be the same magnitude as a transmission time for a largest possible data packet.

8. The method as claimed in claim 1, wherein the ring redundancy method comprises a media redundancy protocol method and the managing ring device assumes a role of the media redundancy manager.

9. The method as claimed in claim 1, wherein the ring redundancy method comprises one of (i) a high-speed redundancy protocol method, (ii) a device-level ring method, (iii) a resilient packet ring method, (iv) a Moxa Turbo Ring method and (v) a Hiper Ring protocol method.

10. The method as claimed in claim 1, wherein cut-through switching is activated for the protected send time window of each ring device.

11. The method as claimed in claim 1, wherein the communication network comprises an Ethernet network.

12. A communication network comprising:
   ring devices including a managing ring device, said ring devices being networked to one another via ring lines in a ring topology;
   wherein the communication network is configured to be operated in order to prevent a delay in transmission of a test packet along the ring topology on account of at least one fault packet within the ring topology by:
   a) synchronizing a time of all ring devices;
   b) implementing at least portions of a data traffic scheduling and handling comprising complete data traffic scheduling and handling, in accordance with Institute of Electrical and Electronics Engineers (IEEE) 802.1Qbv standard in an applied ring redundancy method by applying at least portions of a time aware shaper method comprising a complete time aware shaper method, comprising:
      b1) sorting all test packets in individual ring devices into a separate data traffic priority class;
      b2) allocating an exclusive send queue for the data traffic priority class of the test packets for each ring device;
      b3) defining a protected send time window for an allocated send queue for each ring device; and
      b4) setting up a guard time band at a time immediately before each protected send time window, no data transmission being started within the guard time band, but a data transmission started shortly before the beginning of the guard time band being completeable;
   wherein the transmission of the test packets is scheduled and controlled such that the test packets are each forwarded to the ring devices within the send time window of a ring device without a waiting period.

13. The communication network as claimed in claim 12, wherein the ring devices each comprise at least one of (i) a switch, (ii) a bridge, (iii) a router and (iv) a hub.

14. The communication network as claimed in claim 12, wherein the communication network comprises an Ethernet network.

* * * * *